United States Patent [19]

Nishimatsu et al.

[11] Patent Number: 4,693,934
[45] Date of Patent: Sep. 15, 1987

[54] MAGNETIC RECORDING MEDIUM FOR IMAGE RECORDING

[75] Inventors: Masaharu Nishimatsu; Hiroyuki Arioka; Hideki Ishizaki, all of Nagano, Japan

[73] Assignee: TDK Corporation, Tokyo, Japan

[21] Appl. No.: 738,780

[22] Filed: May 29, 1985

[30] Foreign Application Priority Data

Jun. 8, 1984 [JP] Japan ................................ 59-116595

[51] Int. Cl.$^4$ ................................................. G11B 5/64
[52] U.S. Cl. .................................... 428/336; 427/131; 428/694; 428/900
[58] Field of Search ...................... 428/694, 900, 336; 427/131

[56] References Cited

U.S. PATENT DOCUMENTS

| | | | |
|---|---|---|---|
| 4,318,957 | 3/1982 | Videc | 428/694 |
| 4,411,958 | 10/1983 | Sato et al. | 428/694 |
| 4,425,404 | 1/1984 | Suzuki et al. | 428/694 |
| 4,442,171 | 4/1984 | Sato et al. | 428/694 |
| 4,451,531 | 5/1984 | Isobe et al. | 428/694 |
| 4,555,444 | 11/1985 | Hanaoka | 427/131 |
| 4,579,778 | 4/1986 | Yamaguchi et al. | 427/131 |
| 4,592,948 | 6/1986 | Kohmoto et al. | 427/131 |

*Primary Examiner*—Paul J. Thibodeau
*Attorney, Agent, or Firm*—Stephen F. K. Yee

[57] ABSTRACT

Magnetic recording tape comprising a ferromagnetic thin film on a non-magnetic base and having good running stability and low output fluctuation, clogging, and dropout can be obtained by making the stiffness of the overall tape $$0.149 \times wa^3/dxb = 0.02 \text{ to } 0.12 \text{ g mm}$$

wherein
  w: load (g)
  a: radius of tape ring (mm)
  b: tape width (mm)
  d: deformation of tape ring (mm)

The stiffness in the above formula can be determined by the method described in the specification.

2 Claims, 1 Drawing Figure

MAGNETIC RECORDING MEDIUM FOR IMAGE RECORDING

BACKGROUND OF THE INVENTION

The present invention relates to magnetic recording media, and in particular to a ferromagnetic thin-film tape for image recording wherein a ferromagnetic thin film serves as the magnetic recording layer, which tape has low output fluctuation, clogging, and dropout, and excellent running stability and durability.

Magnetic recording media are used today in a wide range of applications, such as in audio and video recording, computer storage media, and magnetic disks. Along with this, the volume of information recorded on magnetic recording media increases steadily year after year. The result has been a growing demand for higher recording densities in magnetic recording media.

Ferromagnetic thin-film tapes are easier to achieve in nonbinder type magnetic recording media, i.e., ferromagnetic thin-film tapes for image recording, than in coated magnetic recording media, and the saturation magnetization is higher, in addition to which these also have excellent electromagnetic conversion properties. However, owing to their weak contact (touch) with the magnetic head, conventional ferromagnetic thin-film tapes provide poor contact, and are overly susceptible to output fluctuation, clogging, and dropout.

SUMMARY OF THE INVENTION

Through careful research aimed at improving upon these drawbacks, we found that, in magnetic recording tapes comprising a ferromagnetic this film provided on a nonmagnetic base, when the stiffness of the overall ferromagnetic thin-film recording tape lies within a given range, a magnetic tape with running stability and low output fluctuation, clogging, and dropout can be obtained. This discovery led ultimately to the present invention.

BRIEF DESCRIPTION OF THE DRAWINGS

The FIGURE shows the relationship between the base thickness and stiffness of the ferromagnetic thin film tape.

DESCRIPTION OF THE PREFERRED EMBODIMENTS

Figure 1:
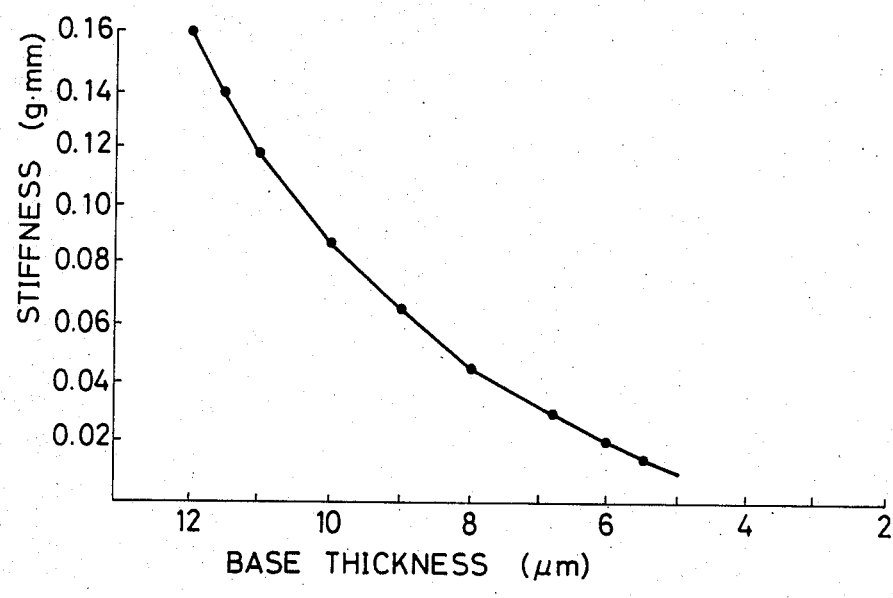

This invention concerns a ferromagnetic thin-film tape for image recording having a stiffness of $$0.149 \times wa^3/db = 0.02 \text{ to } 0.12 \text{ g·mm}$$

wherein
w: load (g)
a: radius of tape ring (mm)
b: tape width (mm)
d: deformation of tape ring (mm)

The stiffness in the above formula is determined as follows. First, the ferromagnetic thin-film tape for image recording is rolled into a ring with the magnetic side (which may have a topcoat) on the inside and the base side (which may have a backcoat) on the outside. Then, taking the radius of the tape ring as a (mm), the tape width as b (mm), and the deformation in the direction of force when a load w (g) is applied to the tape surface from the top of the tape ring while the tape face is in contact with the base as d (mm), each of these values is inserted into the above formula.

When the stiffness value of the tape exceeds 0.12 g·mm, output fluctuation, clogging, and dropout tend to arise. This is because high tape stiffness results in poor tape contact with the head. When the stiffness value is less than 0.02 g·mm, head contact becomes too strong, which is undesirable, causing the tape to stop during running, scraping of the topcoat, and increased head adhesion. Even more preferable is a range in stiffness value of from 0.03 to 0.09 g·mm.

The stiffness of ferromagnetic thin film tapes can be adjusted in a number of ways, several of which are listed below:

(1) by changing the thickness of the base;
(2) by using a flexible material with a low Young's modulus as the base;
(3) by using a base comprising the combination of a hard material on one side and a material with a low Young's modulus on the other;
(4) by changing the strength of the ferromagnetic thin film;
(5) by using a flexible material as a backcoat layer;
(6) by undercoating the ferromagnetic thin film and/or the backcoat layer with a flexible material, or hardening with the addition of pigment.

The non-magnetic base of the ferromagnetic thin-film tape for image recording may consist of, for example, polyester, polyethylene terephthalate, aromatic polyester, polycarbonate, aromatic polyamide, polysulfone, polyimide, diacetate, triacetate, cellophane, rigid polyvinyl chloride, or polypropylene. Any other material normally used as this type of base may also be employed.

In (1)–(3) above, the stiffness may be adjusted by means of the Young's modulus of the base, the base thickness, or use of a laminated base. In (4), the stiffness can be adjusted by the oxygen content, thickness, or materials of the ferromagnetic thin film. In (5), the stiffness can be adjusted by means of the backcoat material. In (6), radiation-curing resins may be used as the undercoating, or fine pigments such as $SiO_2$, $ZrO_2$, $Cr_2O_3$, $Al_2O_3$, $Y_2O_3$, $CeO_2$, $Fe_3O_4$, $Fe_2O_3$, $ZrSiO_4$, $Sb_2O_5$, $TiO_2$. In the case of $SiO_2$, for example, this fine pigment may be:

(i) superfine colloidal solutions of silica (Snowtex, aqueous, methanol silicasol, etc.; Nissan Chemical Industries);

(ii) superfine anhydrous silica prepared by the combustion of purified silicon tetrachloride (standard grade - 100 Å, Aerosil; Nihon Aerosil K.K.)

Superfine aluminium oxide prepared in the same way as the superfine colloidal solutions in (i) or by the same vapor phase process as in (ii) above may also be used, as may titanium oxide and the above-mentioned fine pigments.

When methanol $SiO_2$ is used as the undercoat layer, it may be applied directly in this form.

The fine pigments should contain from 1000 to 1,000,000 particles per 100 square microns, and the mean particle size should be no larger than 500 Å. The Young's modulus may be adjusted by changing the particle size and number of particles per unit area thereof.

Ferromagnetic metals that may be used as the ferromagnetic thin film in the present invention include iron, cobalt, and nickel. Ferromagnetic alloys that may be employed include Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mr-Al, Co-Ni-P, Co-Ni-B, Fe-Co-Ni, Ni-Co-Cr, Co-Ni-Ag, Co-Ni-Na, Co-Ni-Ce, Co-Ni-Zn, Co-Ni-Ca, Co-Ni-W, Co-Ni-Be, and Co-Sm-Ca. These also may be used to adjust the Young's modulus.

A ferromagnetic thin film may be formed directly on the above-described non-magnetic base, or with a non-magnetic thin-film layer therebetween, by a process such as the vacuum deposition, sputtering, ion plating, or plating of the above metals or alloys. Specific examples include the process disclosed in Japanese Patent Publication No. 29769/82, consisting of the deposition in a vacuum of $5.0 \times 10^{-6}$ torr with the base inclined crosswise at an angle of 50° to the evaporation source; the process in common use today wherein the direction of deposition is inclined lengthwise thereto at from 30° to 90°, but is not inclined crosswise, and deposition is conducted in an atmosphere of oxygen or mixed oxygen-argon at a vacuum of about $1 \times 10^{-4}$ torr; and the process whereby a film vacuum-deposited in the absence of oxygen is force-oxidized in an atmosphere of, for example, 90° C. and 20% RH, and the surface opposite to the base oxidized. The oxygen content of oxygen-containing ferromagnetic thin films, given as the ratio of oxygen to magnetic metal, is from 3 to 60%.

The ferromagnetic thin-film tape for image recording of the present invention may also be provided with a topcoat layer and a backcoat layer. Providing a topcoat layer gives a tape having reduced friction, excellent resistance to rusting and corrosion, and outstanding running stability and durability. The provision of a backcoat gives a tape with low curling and dropout, and excellent running durability and electromagnetic conversion properties.

The topcoat and backcoat layers may be formed by coating, vacuum deposition, sputtering, ion-plating, plating, glow treatment, or the like. The coating method may be, for example, a process whereby one or more additives such as antioxidants, lubricants, monomers, polymers, oligomers, and inorganic pigxments is diluted with solvent and applied lightly to the surface of the ferromagnetic metal thin film. The vacuum deposition method may be a method whereby said additives are vaporized in air, an inert gas, or a vacuum, and the vapor applied to the surface of the ferromagnetic metal thin film. Sputtering may be used to form a metal or oxide layer on the topcoat. The ferromagnetic thin-film tape may be given a special treatment such as plasma treatment to increase the adsorptivity of the topcoat material.

The topcoat layer of the present invention may include one or more of the following: antioxidants, lubricants, organic binders, inorganic pigments, metals, and the like.

With regard to formation by a coating or vacuum deposition method, lubricants used in this type of magnetic recording media, such as silicone oil, fluorine-contained oil, fatty acids, fatty acid esters, paraffins, liquid paraffins, surfactants, and the like may be used as the topcoat layer, but the use of fatty acids and/or fatty acid esters is preferable.

The fatty acids should have twelve or more carbons (RCOOH, where R is an alkyl group having at least 11 carbons); examples include caprylic acid, capric acid, lauric acid, myristic acid, palmitic acid, stearic acid, behenic acid, oleic acid, elaidic acid, linoleic acid, linolenic acid, and stearic acid. Fatty acid esters that may be used include those prepared from monobasic fatty acids having 12–16 carbons and monohydric alcohols having 3–12 carbons, and those prepared from monobasic fatty acids having at least 17 carbons and monohydric alcohols that bring the total number of carbons to 21–23.

Silicones that may be employed are those modified with fatty acid and partially modified by fluorination. The alcohols used are higher alcohols, and the fluorine should be of a type obtained by electrolytic substitution, telomerization, oligomerization, or the like.

Radiation-set substances may also be used as the lubricant, with good effects. These may be advantageously employed to prevent the transfer of roughness of the rear side to the ferromagnetic thin film, reduce dropout, decrease output differences at the internal and external diameters when the tape is wound up in a roll, and make online fabrication feasible.

Any antioxidant may be used in the topcoat layer of the present invention provided it prevents the oxidation of metal. Standard antioxidants that may be used are classified below according to structure:

1. Phenolic antioxidants
2. Amine-based antioxidants
3. Phosphorus-based antioxidants
4. Sulfur-based antioxidants
5. Organic acid, alcohol, and ester-based antioxidants
6. Quinone-based antioxidants
7. Inorganic acid and inorganic salt-based antioxidants Concrete examples of these antioxidants are listed below.

(1) Examples of phenolic antioxidants include 2,6-di-t-butyl-p-cresol, 2,6-di-t-butyl phenol, 2,4-di-t-methyl-6-t-butylphenol, butylhydroxy anisole, 2,2'-methylene bis(4-methyl- 6-t-butylphenol), 4,4'-butylidene bis(3-methyl-6-t-butylphenol), 4,4'-thiobis(3-methyl-6-t-butylphenol), tetrakis [methylene-3(3,5-di-t-butyl-4-hydro-xyphenyl) propionate]methane, 1,1,3-tris(2-methyl-4-hydroxy-5-t-butylphenyl)butane, dibutylhydroxytoluene, propyl gallate, guaiac, and nordihydroguaiaretic acid. Methacrytlate and acrylate type radiation-curing antioxidants of this type that may be used include monoglycol salicylates, 2,5-di-t-butylhydroxyquinone, 2,4-dihydroxybenzophenone, 2,4,5-trihydroxybutyrophenone, and hydroquinone.

(2) Examples of amine-based antioxidants include phenyl-β-naphthylamine, α-naphthylamine, N,N'-didibutyl-p-phenylenediamine, phenothiazine, and N,N'-diphenyl-p-phenylenediamine, as well as alkanolamines and phospholipids. Radiation-curing amine-based antioxidants that may be used include dimethylaminoethyl-methacrylate and acrylates.

(3) The phosphorus-based antioxidants may or may not be radiation-curing antioxidants. The R group in the phosphate ester portion contains an alkyl or alkylphenyl group, and ethylene oxide or propylene oxide. The carbon number of the R group is preferably 1 to 26, and more preferably 1 to 22. The phosphate ester may contain mono-, di-, or triphosphate; the mono- or diphosphate components may be large, and the triphosphate component may be excluded. The phosphate ester contains NH4 type phosphate, as well as methacrylate and acrylate type phosphate.

Specific examples include phosphite esters such as triphenyl phosphite, trioctadecyl phosphite, tridecyl phosphite, and trilauryl triphosphite; and phosphate esters such as hexamethylphosphoric triamide, butyl phosphate, cetyl phosphate, butoxyethyl phosphate, 2-ethylhexyl phosphate, β-choloroethyl phosphate, butoxyethyl phosphate diethylamine salt, di(2-ethylhexyl) phosphate, ethylene glycol acid phosphate, (2-hydroxyethyl) methacrylate phosphate, butylhydroxy methacrylate phosphate, caprylhydroxy methacrylate phosphate, myristylhydroxy methacrylate phosphate, stearyl hydroxymethacrylate phosphate, cetylhydroxy methacrylate phosphate, butylphenylhydroxy methacrylate phosphate, amylphenylhydroxy methacrylate phosphate, nonylphenylhydroxy methacrylate phosphate, and the acrylates and phenyl phophates of these, as well as nonylphenyl phosphate and the phenyl phosphates of other alcohols, and vanadate type phosphate esters.

(4) Examples of the sulfur-based antioxidants that may be cited include dilaurylthiodipropionate, distearylthiodipropionate, laurylstearylthiodipropionate, dimyristylthiodipropionate, distearyl-β, β'-thiodibutylate, 2-mercaptobenzoimidazole, and dilaurylsulfide, and radiation-curing methacrylates and acrylates such as 4,4'-thio-bis(3-methyl-6-t-butyl-phenol) and 2,2-thiobis(4-methyl-6-t-butylphenol). These may also include ethylene oxide and propylene oxide.

(5) Examples of organic acid, alcohol, and ester type antioxidants include sorbitol, glycerin, propylene glycol, adipic acid, citric acid, and ascorbic acid, in addition to which the radiation-curing forms of these may also be used.

(6) Quinone-based antioxidants that may be used include hydroquinone and tocopherols. The radiation-curing forms of these are also acceptable.

(7) A representative example of the inorganic acid, inorganic salt type antioxidants is phosphoric acid.

Although the phosphate ester may be prepared by known processes, the method cited in Japanese Patent Application No. 44223/82 may also be used. With radiation-curing antioxidants, because online curing onto the ferromagnetic thin film is possible, there is no deterioration in surface smoothness due to the transfer of the roughness of the rear side caused by rolling during heat-curing. Hence, a decrease in output does not occur. Moreover, in addition to the resulting improvements in tape properties, such as the prevention of dropout, and the decrease in output differences at the internal and external diameters when the tape is wound up in a roll, benefits are to be had also in processing, such as making on-line fabrication possible.

Organic binders that can be used as the topcoat in the present invention may be polymers, monomers, or oligomers.

Thermoplastic resins, thermosetting resins, or reactive resins normally used in magnetic recording media, or combinations thereof may be employed as the polymer. Curing resins, and especially radiation-curing resins are preferable from the standpoint of the strength of the resulting coating.

The thermoplastic resins should have a softening temperature of no more than 150° C., an average molecular weight of 10,000 to 200,000, and a degree of polymerization of about 200 to 2000. Examples include various types of synthetic rubber thermoplastic resins, and mixtures thereof, such as vinyl chloride-vinyl acetate copolymer (which may include carboxylic acid), vinyl chloride-vinyl acetate-vinyl alcohol copolymer (which may include carboxylic acid), vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylate ester-acrylonitrile copolymer, methacrylate ester-vinylidene chloride copolymer, methacrylate ester-styrene copolymer, urethane elastomer, nylon-silicone resins, nitrocellulose-polyamide resins, polyfluorovinyl, vinylidene chloride-acrylonitrile copolymer, butadiene-acrylonitrile copolymer, polyamide resins, polyvinyl butyral, cellulose derivatives (such as cellulose acetate, cellulose diacetate, cellulose triacetate, cellulose propionate, and nitrocellulose), styrene-butadiene copolymer, polyester resins, chlorovinyl ether-acrylic ester copolymer, amino resins, and the like.

The thermosetting resins and the reactive resins should have an average molecular weight of no more than 200,000 as the coating fluid. When heated following application and drying, these attain an essentially infinite molecular weight via condensation and addition reactions. Of these, resins that do not soften or melt prior to thermal decomposition are desirable. Specific examples include phenolic resins, epoxy resins, polyurethane curing resins, urea resins, melamine resins, alkyd resins, silicone resins, acrylic reactive resins, epoxy-polyamide resins, nitrocellulose-melamine resins, high-molecular-weight polyester resins, isocyanate prepolymer mixtures, mixtures of methacrylate copolymer and diisocyanate prepolymer, mixtures of polyester polyol and polyisocyanate, urea formaldehyde resins, low-molecular-weight glycol/ high-molecular-weight diol/-triphenylmethane triisocyanate mixtures, polyamine resins, and mixtures of the above.

As for the radiation-curing resins, these may be resins containing, or in which have been introduced, radicals that crosslink or polymerize under irradiation. Examples of such radicals include the acrylic double bonds of the type found in acrylic acids and methacrylic acids having unsaturated double bonds with radical polymerizability, or ester compounds thereof, allyl double bonds of the type found in diallylphthalates, and unsaturated bonds found in maleic acid and maleic acid derivatives. Binder components that may be used include monomers such as acrylic acid, methacrylic acid, and acrylamide. Binders with double bonds may be obtained by the modification of various types of polyester, polyols, and polyurethanes, for example, with compounds bearing acrylic double bonds. Morever, various molecular weights may also be obtained, if necessary, by blending polyhydric alcohols and polyvalent carboxylid acids. The above-mentioned resins are a sampling of the radiation-sensitive resins that may be used; these may also be employed as mixtures thereof.

The aforementioned radiation-curing monomers, radiation-curing oligomers, and radiation-curing polymers may be monomers, oligomers, and polymers containing, or in which have been introduced, radicals that crosslink or polymerize under irradiation. Examples of such radicals include the acrylic double bonds of the type found in acrylic acids and methacrylic acids having unsaturated double bonds with radical polymerizability that respond to ionized energy, or ester compounds thereof, allyl double bonds of the type found in diallylphalates, and the unsaturated bonds found in maleic acid and maleic acid derivatives.

In addition, silane coupling agents, titanium coupling agents, and the like may also be added.

Compounds with molecular weights below 2,000 may be used as the radiation-curing monomers, and compounds with molecular weights of from 2,000 to 10,000 may be used as the radiation-curing oligomers.

The use of a radiation-curing binder enables continuous, online processing during topcoat formation, which is energy efficient and reduces manufacturing costs.

In backcoat layer formation by, for example, a coating process, the backcoat layer contains inorganic pigments, organic binder, lubricants, and the like.

Inorganic pigments are of two types: (1) electrically conductive carbon black and graphite, and (2) the inorganic fillers $SiO_2$, $TiO_2$, $Al_2O_3$, $Cr_2O_3$, SiC, CaO, $CaCO_3$, zinc oxide, geothite, $\alpha$-$Fe_2O_3$, talc, kaolin, $CaSO_4$, boron nitride, fluorinated graphite, molybdenum disulfide, and ZnS. The appropriate amounts of these inorganic pigments for use in the backcoat layer are 20-200 parts by weight of (1), and 10-300 parts by weight of (2), per 100 parts of binder. Too much inorganic pigment renders the coated film brittle, causing an increase in dropout.

The same lubricants, monomers, oligomers, and polymers can be used in the backcoat layer as in the topcoat layer.

The organic binders employed in the backcoat layer of the present invention may be a thermoplastic, thermosetting, or reactive resin of the type normally used in magnetic recording media, or a combination thereof. A curing resin, and especially a radiation-curing resin, is preferable from the standpoint of the strength of the coated film thus obtained.

When a thermosetting resin is used, differences in the electromagnetic conversion properties arise between the inside and outside portions of a jumbo roll during thermosetting on account of transfer of the roughness of the backcoat surface due to rolling during the curing process.

In contrast, when a radiation-curing resin is used, continuous curing becomes possible, the curing time is short, there is no transfer of the roughness of the rear side to the ferromagnetic layer so dropouts can be minimized, in addition to which topcoat processing can be conducted online. As a result, this is useful as an energy conserving measure and for the reduction of personnel in manufacture, helping to cut production costs. As for tape properties, dropout due to rolling during heat curing is eliminated, as are output differences on account of the distance in the longtudinal direction of the magnetic tape arising from pressure differences at the inside and outside diameters when the tape is wound into a roll.

Moreover, since curing can be achieved in a short time through this method, even with non-solvent type resins, such resins can be used to form the backcoat.

When the lubricants, antioxidants, and organic binders in the topcoat and backcoat layers are radiation-curing materials, the active energy beam used for crosslinking these may be an electron beam with a radiation accelerator as the beam source, alpha rays with cobalt-60 as the source, beta rays with strontium-90 as the source, x-rays with an x-ray generator as the source, ultraviolet light, or the like.

Taking into consideration concerns having to do with the irradiation source, such as control of the absorbed dose, installation on a manufacturing line, and shielding of personnel and equipment from ionizing radiation, the use of radiation from a radiation heater is advantageous.

Ideally, the radiation properties used in curing the above-described backcoat and topcoat layers should consist of, in terms of penetrability, irradiating to an absorbed dose of 0.5-20 megarads using a radiation accelerator having an acceleration voltage of 100-750 KeV, and preferably 150-300 KeV.

The use of a low-dosage type radiation accelerator such as the Electro-Curtain system manufactured by Energy Sciences, Inc., a U.S. company, in the radiation-curing process of the present invention is extremely advantageous for installation on a tape coating line and the shielding of secondary x-rays in the accelerator interior.

Also quite acceptable is the use of a Van de Graaff accelerator, which is widely used as a radiation accelerator.

During radiation crosslinking, it is important to irradiate the backcoat layer and topcoat layer in a stream of inert gas such as nitrogen or helium. Irradiation in air during crosslinkage of the binder component is highly undesirable because this generates $O_3$ and other products that can interfere with the effective action of radicals generated within the polymer in the crosslinkage reaction. Accordingly, it is important that the atmosphere in which irradiation with the active energy beam occurs has a maximum oxygen concentration of 5%, and is maintained as an essentially inert gas atmosphere consisting of nitrogen, helium, carbon dioxide, or the like.

Ultraviolet curing of the topcoat layer in the present invention is also possible through the addition of photopolymerization sensitizers. Known photopolymerization sensitizers may be used for this purpose. Examples include benzoins such as benzoin methyl ether, benzoin ethyl ether, $\alpha$-methyl benzoin, and $\alpha$-chlorodeoxybenzoin; ketones such as benzophenone, acetophenone, and bisdialkylaminobenzophenone; quinones such as anthraquinone and phenanthraquinone; and sulfides such as benzyl disulfide and tetramethylthiuram monosulfide. The photopolymerization sensitizer should be included in a range of from 0.1 to 10 wt % with respect to the resin solids.

We have cited examples that apply to the use of a coating process. When using other processes for formation of the topcoat and backcoat layers, such as vacuum deposition, sputtering, ion-plating, and plating, materials suitable for the particular process should be selected.

As described above, the adjustment, in the present invention, of the overall stiffness of the ferromagnetic thin-film tape for image recording to within a given numerical range, provides outstanding effects such as low output fluctuation, clogging, and dropout, and the elimination of running stops, topcoat scraping, and head sticking.

The ferromagnetic thin-film tape of the present invention is a magnetic recording medium that can be used primarily as a video tape.

Because this is a high-performance tape with outstanding electromagnetic conversion properties and reliability, the ferromagnetic thin-film tapes of the present invention having a stiffness within a specific range are ideal as video cassette tape--a recording medium that has seen remarkable technical progress and market expansion in recent years, 8 mm video cassette tape to be launched shortly, and related products.

The following examples further illustrate the present invention, yet this invention is not to be construed as being defined or limited by these specific embodiments.

The attached FIGURE shows the relationship between the base thickness and stiffness of the ferromagnetic thin-film tape for image recording of the present invention. The vertical axis represents the stiffness in gram millimeters (g·mm) and the horizontal axis represents the base thickness in microns ($\mu$m).

EXAMPLE 1

(1) Formation of magnetic layer

Ferromagnetic thin film 1:

While moving a polyester film with a thickness of 12 $\mu$m over the surface of a cylindrical cooling can in a chamber flushed at a rate of 800 cc per minute with a 1:1 volumetric mixture of oxygen and argon and held at a vacuum of $1.0 \times 10^{-14}$ torr, a Co-80/Ni-20 alloy was melted and only that portion of the film having an angle of incidence of 30°–90° was vacuum deposited with the alloy to form a thin film of Co-Ni-O with a thickness of 0.15 $\mu$m. Oxygen was ubiquitously present at the interface with the base and on the surface of the side opposite to the base. The latter side was almost entirely covered with just oxide. Hc=1000 Oe.

The average oxygen quantity compared to the cobalt and nickel was 40%, as given by the atomic ratio (O/CoNi × 100).

Ferromagnetic thin film 2:

A polyester film with a thickness of 12 $\mu$m was moved over the surface of a cylindrical cooling can, and vacuum-deposited in the same manner as ferromagnetic thin film 1 within a chamber held at a vacuum of $5.0 \times 10^{-6}$ torr. A thin essentially of Co-Ni and having a thickness of 0.15 $\mu$m was formed.

This tape was force-oxidized in a 90° C., 20%RH atmosphere, such as to coat the entire surface of the side opposite to the base with just oxide. Hc=900 Oe. The average oxygen quantity in the film was 45%, as given by the atomic ratio with cobalt and nickel.

Ferromagnetic thin film 3:

The same process was carried out as for ferromagnetic thin film 2, except that the oxidation step with oxygen was omitted. Namely, a polyester film with a thickness of 12 $\mu$m was moved over the surface of a cylindrical cooling can, and vacuum-deposited in the same manner as ferromagnetic thin film 1 within a chamber held at a vacuum of $5.0 \times 10^{-6}$ torr. This gave a thin film consisting essentially of Co-Ni and having a thickness of 0.15 $\mu$m. Hc=950 Oe.

(2) Formation of Backcoat Layer

| Backcoat layer 1 (thermosetting): | Parts by weight |
|---|---|
| zinc oxide (80 $\mu$m) | 200 |
| curing agent: Coronate L | 20 |
| lubricants: | |
| stearic acid-modified silicone | 4 |
| butyl stearate | 2 |
| nitrocellulose | 40 |
| vinyl chloride-vinyl acetate-vinyl alcohol copolymer (Sekisui Chemical KK, S-lec A) | 30 |
| polyurethane elastomer (B.F. Goodrich Co., Esten 5703) | 30 |
| mixed solvent (MIBK/toluene) | 250 |

The above mixture was thoroughly mixed and dissolved.

This coating was applied to the 15-micron polyester film, and the solvent drived with an infrared lamp or by hot-air drying. This was followed by surface smoothening treatment, and the crosslinking reaction with isocyanate accelerated by keeping the film as a roll for 48 hours within an oven held at 80° C.

| Backcoat layer 2: | Parts by weight |
|---|---|
| zinc oxide (50 $\mu$m) | 30 |
| carbon black | 25 |
| acrylated vinyl chloride-vinyl acetate-vinyl alcohols copolymer (molecular weight, 30,000) | 40 |
| acrylated polyurethane elastomer (m.w. 20,000) | 40 |
| polyfunctional acrylate (m.w. 1,000) | 20 |
| stearic acid | 4 |
| butyl stearate | 2 |
| mixed solvent (MIBK/toluene) | 250 |

The above mixture was dispersed in a ball mill for five hours, applied to a dry thickness or one micron onto the back surface of a polyester film having a magnetic side, and the solvent dried with an infrared lamp or by hot-air drying. This was followed by surface smoothening treatment, then an electron beam irradiated in nitrogen gas onto the backcoat layer using an Electro-Curtain type electron beam accelerator at an accelerating voltage of 150 KeV, an electrode current of 10 mA, and an absorbed dose of 5 Mrad.

| Backcoat layer 3: | parts by weight |
|---|---|
| CaCO$_3$ (80 m$\mu$) | 50 |
| acrylated vinyl chloride-vinyl acetate-vinyl alcohol copolymer (m.w. 30,000) | 30 |
| acrylated polyurethane elastomer (m.w. 50,000) | 30 |
| acrylated phenoxy resin (m.w. 35,000) | 20 |
| polyfunctional acrylate (m.w. 500) | 20 |
| stearic acid | 4 |
| solvent (MEK:toluene = 1:1) | 300 |

These were processed and a backcoat formed as above.

(3) Formation of Topcoat Layer

| Topcoat compositions | parts by weight |
|---|---|
| Topcoat composition 1: | |
| methacryloxyethylphosphate | 0.5 |
| pentaerythritol tetraacrylate (m.w. 88 per double bond) | 0.4 |
| stearic acid | 0.1 |
| cyclohexanone | 100 |
| Topcoat composition 2: | |
| dimethylaminoethylmethacrylate | 0.6 |
| perchloroalkylacrylate | 0.2 |
| cyclohexanone | 100 |
| Topcoat composition 3: | |
| monoglycolsalicylate acrylate | 0.3 |
| polyfunctional oligoester acrylate (Allox M-8100, Toagosei Chemical Industry) (m.w. 200 per double bond) | 0.6 |
| palmityl parmitate | 0.1 |
| cyclohexanone | 100 |

Preparation of Topcoat Layer and Properties Thereof

1. Topcoat layer 1 was prepared as follows. Topcoat composition 1 is applied directly onto ferromagnetic thin films (1)–(3), irradiated in nitrogen gas at an accelerating voltage of 150 KeV, an electrode current of 6 mA, and an absorbed dose of 3 Mrad, giving a topcoat layer 100 Å thick.

2. Topcoat layer 2 was prepared by applying topcoat composition 2 onto ferromagnetic thin films (1)–(3), and irradiating in nitrogen gas at an accelerating voltage of 150 KeV, an electrode current of 6 mA, and an absorbed dose of 3 Mrad, giving a topcoat layer 60 Å thick.

Table 1 also shows the properties of these magnetic tapes.

TABLE 1*

| Base Thickness (μm) | | 12 | 11.5 | 11 | 10 | 8 | 6.8 | 6 | 5 |
|---|---|---|---|---|---|---|---|---|---|
| stiffness (g · mm) | | 0.16 | 0.14 | 0.12 | 0.09 | 0.05 | 0.03 | 0.02 | 0.01 |
| initial (20°, 60% RH) | output fluctuation (dB) | 3 | 2.5 | 1.0 | 0.2 | 0.2 | 0.2 | 0.5 | 2.0 |
| | clogging | heavy | heavy | v.l. | none | none | none | v.l. | heavy |
| | dropouts (per minute) | 2000 | 2000 | 100 | 80 | 80 | 90 | 120 | 2000 |
| after 30 runs (20°, 60% RH) | clogging | heavy | heavy | light | none | none | v.l. | light | stop on 2nd run |
| | topcoat scraping | small | small | small | none | none | v.s. | small | large on 2nd run |
| | head adhesion | small | small | none | none | none | none | small | — |
| | edge scratching | none | none | none | none | none | small | moderate | large |

*Tests conducted using modified 8 mm VTR deck
Note:
v.l. = very light
v.s. = very small 3. Topcoat layer 3 was prepared by applying topcoat composition 3 onto ferromagnetic thin films (1)–(3), and irradiating in nitrogen gas at an accelerating voltage of 150 KeV, an electrode current of 10 mA, and an absorbed dose of 5 Mrad, giving a topcoat layer 100 Å thick.

4. Topcoat composition 4

| | parts by weight |
|---|---|
| (a) dimethylaminoethylmethacrylate | 0.6 |
| cyclohexanone | 100 |

This was applied onto ferromagnetic thin film (1), and irradiated in nitrogen gas at an accelerating voltage of 150 KeV, an electrode current of 10 mA, and an absorbed dose of 5 Mrad.

| | parts by weight |
|---|---|
| (b) stearylmethacrylate | 0.1 |
| fluorine-contained oil (telomerization method) | 0.2 |
| MEK | 100 |

The above was then applied on top of (a) and irradiated in nitrogen gas at an accelerating voltage of 150 KeV, an electrode current of 4 mA, and an absorbing dose of 2 Mrad. Topcoat layer thickness was 70 Å.

5. Stearyl alcohol was vacuum deposited under a vacuum of $4 \times 10^{-3}$ torr on top of topcoat composition (a) applied over ferromagnetic thin film (2). Fluorine-contained oil was then vacuum-deposited under a vacuum of $4 \times 10^{-3}$ torr on top of the stearyl alcohol. Topcoat layer thickness was 70 Å.

Examples of the adjustment of film stiffness are given below.

(1) Adjusting stiffness by changing base thickness:

The stiffness of ferromagnetic thin film 1 can be adjusted by changing the thickness of the base of a balanced-type polyester (Young's modulus, 400 kg/mm²).

Table 1 shows the stiffness values for balanced type polyester base thicknesses of 12, 11.5, 11, 10, 8, 6.8, 6, and 5 microns on a ferromagnetic thin film comprising the combination of ferromagnetic thin film 1 and backcoat layer.

(2) The ferromagnetic thin-film tapes used here were prepared by applying an undercoat (10,000 particles/100μ²) of colloidal silica (100 Å) to the polyester film, then forming on top of this a ferromagnetic thin film.

As is clear from Table 1, when the stiffness exceeds 0.12, head touch deteriorates, and increases occur in the initial output fluctuation and clogging, resulting in frequent dropout. Topcoat scraping and head adhesion were small. This shows that clogging and output fluctuation arise on account of poor head touch.

On the other hand, when the stiffness is less than 0.02, running is unstable due to high friction, causing large output fluctuation. Because the head touch is too strong, clogging tends to arise. This again leads to frequent dropout. The high friction resulted in a running stop the second time the tape is run.

By holding stiffness to within this range of 0.02 to 0.12, a recording medium with outstanding electrical and physical properties is obtained.

(2) Adjusting stiffness by changing Young's modulus of base:

(i) By changing the 11.5μ base in Example (1) above to a balanced type polyester base having a Young's modulus of 280 kg/cm², the stiffness achieved was 0.10 g·mm.

(ii) By changing the 10.0μ base in Example 1 above to a tensorized type polyester base having a Young's modulus of 800 kg/cm², the stiffness achieved was 0.18 g·mm.

Tape (i) has good properties: an output fluctuation of 0.2 dB, no clogging, less than 100 dropouts, and outstanding running durability.

Because tape (ii) had a stiffness of over 0.12 g·mm, head touch was poor, output fluctuation and clogging were large, and dropout was also large.

(3) Adjusting stiffness by using a lamination base:

By changing the 11.5μ base in Example (1) above to a lamination base consisting of a balanced type polyester having a Young's modulus of 400 kg/cm² and a polypropylene with a Young's modulus of 100 kg/cm², the stiffness achieved was 0.09 g·mm.

Reducing stiffness resulted here in a good tape without clogging and low dropout.

(4) Adjusting stiffness by using a flexible material in the
backcoat layer:

For example, in the combination of ferromagnetic thin film 2 (polyester base, 10 μm), backcoat layer 1, and topcoat layer 2, output fluctuations, clogging, and dropouts were satisfactory because this combination has a stiffness of 0.12 g·mm.

When the backcoat layer is formed by the vacuum deposition of zinc under a vacuum of $5 \times 10^{-6}$ torr, and stearic acid vacuum-deposited on top of this, the stiffness obtained was 0.13 g·mm. Since the stiffness exceeded 0.12, the head touch deteriorated, output fluctuation and clogging increased, and dropouts became more frequent.

The same is true also when the backcoat thickness is changed.

(5) Other examples:

(a) By varying the thickness and strength of ferromagnetic thin film (b) Either by applying flexible undercoat beneath ferromagnetic thin film and/or backcoat to soften them, or by adding pigments under the ferromagnetic thin film and/or the backcoat to harden them.

The undercoat may be formed from a radiation-curing resin or a fine pigment used, such as $SiO_2$, $ZrO_2$, $Cr_2O_3$, $Al_2O_3$, $Y_2O_3$, $CeO_2$, $Fe_3O_4$, $Fe_2O_3$, $ZrSiO_4$, $Sb_2O$, $TiO_2$, and the like. When $SiO_2$ is used, for example, examples of the fine pigment include:

(i) superfine colloidal solutions of silica (Snowtex, aqueous, methanol silicasol, etc.; Nissan Chemical Industries).

(ii) superfine anhydrous silica prepared by the combustion of purified silicon tetrachloride (standard grade - 100 Å, Aerosil; Nihon Aerosil K.K.)

Superfine aluminium oxide prepared in the same way as the superfine colloidal solutions in (i) or by the same vapor phase process as in (ii) above, or titanium oxide and the above-mentioned fine pigments may also be used.

When methanol $SiO_2$ is used as the undercoat layer, it may be applied directly in this form.

The fine pigments should contain from 1000 to 1,000,000 particles per 100 square microns, and the mean particle size should be no larger than 500 Å (preferably less than 200 Å, and most preferably 150 Å or less). The Young's modulus may be adjusted by changing the particle size and number of particles per unit area thereof.

(c) By varying the Young's modulus through the inclusion of the above fine pigments in the topcoat layer.

The above has been mentioned also in the sections describing ferromagnetic thin film 3, backcoat 3, and topcoats 3 and 4.

The properties mentioned above are measured as follows.

1. Stiffness:

This is calculatged using the equation:

$$0.149 \times wa^3/db \text{ (g·mm)}$$

wherein
w: load (g)
a: radius of tape ring (mm)
b: tape width (mm)
d: deformation in tape ring (mm)

2. Output fluctuation:

Fluctuation in output when recording and playing back at a center frequency of 5 MHz.

3. Dropout:

A single signal at 5 MHz was recorded and played back at 20° C. and 60% with a VHS recorder. The number of intervals during which the signal played back was at least 18 dB lower than the mean playback level for at least 15 microseconds was measured. Counts were taken over one minute for ten samples and the average of these samples used as the dropout value.

4. Topcoat scraping:

We modified a commercially available VHS type VTR, and used it to observe topcoat scraping after 30 runs at 20° C. and 60%.

5. Edge scratching:

The presence or absence of scratches at the tape edge after 30 runs was observed.

We claim:

1. A ferromagnetic thin-film for image recording having a magnetic layer consisting of a ferromagnetic thin film formed on a base film and a backcoat layer formed on an opposite side thereof, said base film having a Young's modulus in the range of from about 280 to 800 kg/cm$^2$ and a thickness in the range of from 5 to 12 μm, said tape having a stiffness of $$0.149 \times wa^3/d \times b = 0.02 \text{ to } 0.12 \text{ g·mm}$$

wherein
w: load (g)
a: radius of tape ring (mm)
b: tape width (mm)
d: deformation of tape ring (mm).

2. A ferromagnetic thin-film tape for image recording according to claim 1 wherein the stiffness is from 0.03 to 0.09 g·mm.

* * * * *